(12) United States Patent
Wang et al.

(10) Patent No.: US 10,627,566 B2
(45) Date of Patent: Apr. 21, 2020

(54) BACKLIGHT MODULE AND DISPLAY DEVICE

(71) Applicants: Beijing BOE Optoelectronics Technology Co., Ltd., Beijing (CN); BOE TECHNOLOGY GROUP CO., LTD., Beijing (CN)

(72) Inventors: Yanming Wang, Beijing (CN); Xi Chen, Beijing (CN); Desheng Xiang, Beijing (CN); Cuie Wang, Beijing (CN); Yajun Guo, Beijing (CN); Zhengxuan Lv, Beijing (CN); Jian Ren, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/403,815

(22) Filed: May 6, 2019

(65) Prior Publication Data

US 2020/0012039 A1 Jan. 9, 2020

(30) Foreign Application Priority Data

Jul. 3, 2018 (CN) .......................... 2018 1 0720024

(51) Int. Cl.
*F21V 8/00* (2006.01)
*G02F 1/1333* (2006.01)

(52) U.S. Cl.
CPC ......... *G02B 6/0088* (2013.01); *G02B 6/0053* (2013.01); *G02F 2001/133311* (2013.01); *G02F 2001/133317* (2013.01)

(58) Field of Classification Search
CPC ........ G02F 2001/133311; G02F 2001/133317; G02B 6/0088
See application file for complete search history.

(56) References Cited

U.S. PATENT DOCUMENTS 6,204,906 B1 * 3/2001 Tannas, Jr. ............ G02F 1/1339 349/153
9,164,321 B2 * 10/2015 Matsumoto ....... G02F 1/133615
(Continued)

FOREIGN PATENT DOCUMENTS

CN 1892315 1/2007
CN 101393341 3/2009
(Continued)

OTHER PUBLICATIONS

First Office Action dated Feb. 3, 2020 for Chinese Patent Application No. 201810720024.2.

*Primary Examiner* — Alexander K Garlen
(74) *Attorney, Agent, or Firm* — Thomas | Horstemeyer LLP (57) ABSTRACT

The present disclosure provides a backlight module and a display device. The backlight module includes a back plate, a first film layer, and a bonding portion. The back plate includes a back plate body and a side plate, where the side plate is disposed at a periphery of the back plate body and extends from the periphery of the back plate body. The first film layer is located in the accommodation space and is disposed as the outermost surface of the backlight module, and includes a film layer body and a protruding portion protruding from a periphery of the film layer body, where a projection of the protruding portion at a plane of the backlight exceeds a projection of the side panel at a plane of the backlight. The bonding portion is disposed at an outer side of the side plate and bonding the protruding portion and the side plate.

16 Claims, 5 Drawing Sheets

(56) References Cited

U.S. PATENT DOCUMENTS

| | | | | |
|---|---|---|---|---|
| 9,395,568 | B2 * | 7/2016 | Jeong | G02B 6/009 |
| 2007/0030700 | A1 | 2/2007 | Pan | |
| 2012/0264345 | A1 * | 10/2012 | Yoon | G02F 1/1303 |
| | | | | 445/25 |
| 2013/0027857 | A1 * | 1/2013 | Jeong | G02F 1/133308 |
| | | | | 361/679.01 |
| 2013/0293804 | A1 * | 11/2013 | Kim | G02F 1/133308 |
| | | | | 349/58 |
| 2014/0043558 | A1 * | 2/2014 | Hwang | G02B 6/0095 |
| | | | | 349/58 |
| 2014/0160694 | A1 * | 6/2014 | Yoon | G02F 1/1303 |
| | | | | 361/749 |
| 2016/0062182 | A1 * | 3/2016 | Cho | G02F 1/1339 |
| | | | | 359/483.01 |
| 2016/0363720 | A1 * | 12/2016 | Li | G02B 6/0088 |
| 2017/0261671 | A1 * | 9/2017 | Zhou | G02B 6/005 |
| 2018/0120498 | A1 * | 5/2018 | Tanaka | G02B 6/005 |

FOREIGN PATENT DOCUMENTS

| | | |
|---|---|---|
| CN | 102128387 | 7/2011 |
| CN | 204477831 | 7/2015 |
| CN | 105911751 | 8/2016 |

* cited by examiner

BACKLIGHT MODULE AND DISPLAY DEVICE

CROSS-REFERENCE TO RELATED APPLICATIONS

The present application is based on, and claims the benefit of and priority to, Chinese Patent Application No. 201810720024.2, filed on Jul. 3, 2018, the entire contents of which are incorporated herein by reference.

TECHNICAL FIELD

The present disclosure relates to the field of display technologies, and in particular, to a backlight module and a display device.

BACKGROUND

With the rapid development of electronic technology, people have higher requirements for their electronic products. Taking a smart phone as an example, the narrow frame design of the mobile phone screen can make the product more fashionable and, to a certain extent, can also increase the screen ratio of the screen, so as to widen the picture, thereby meeting the increasing demand of the consumer for display products.

SUMMARY

A main object of the present disclosure is to overcome the drawbacks of the backlight module in the above-described related art that is easy to be disassembled, and to provide a backlight module that is not easily disassembled and a display device in which the backlight module is mounted.

In order to solve the technical problem described above, an embodiment of the present disclosure provides a backlight module which includes a back plate, a first film layer, and a bonding portion. The back plate includes a back plate body and a side plate, where the side plate is disposed at a periphery of the back plate body and extends from the periphery of the back plate body. An accommodation space is defined between the back plate body and the side plate. The first film layer is located in the accommodation space and is disposed as the outermost surface of the backlight module, and includes a film layer body and a protruding portion protruding from a periphery of the film layer body, where a projection of the protruding portion at a plane of the backlight exceeds a projection of the side panel at a plane of the backlight. The bonding portion is disposed at an outer side of the side plate and bonding the protruding portion and the side plate.

Optionally, the film layer body is coplanar with the protruding portion.

Optionally, the side plate is provided with corner portions corresponding to corners of the back plate body, and the protruding portion is disposed correspondingly to at least one the corner.

Optionally, the protruding portion is one of a plurality of protruding portions disposed at each corner portion correspondingly.

Optionally, the corner portion of the side plate is configured to have a chamfer angle or an oblique angle.

Optionally, the protruding portion is provided with a chamfer angle or an oblique angle corresponding to the chamfer angle or the oblique angle of the corner portion of the side plate.

Optionally, a recess is provided at the side plate through which the protrusion is configured to protrude outside the accommodation space.

Optionally, a display area of the backlight module is configured to have a chamfer angle or an oblique angle.

Optionally, a product of a thickness H of the bonding portion and a length L of the bonding portion meets the following conditions:

$$H \cdot L \geq \frac{K \cdot Mg}{F},$$

wherein, Mg represents a weight of the backing plate; F represents a bonding strength between the bonding portion and the first film layer; K≥1, which is a reliability coefficient.

Optionally, a thickness of the bonding portion is greater than or equal to 0.2 mm.

Optionally, the first film layer is an upper prism sheet.

Optionally, further comprising a second film layer disposed between the first film layer and the back plate body, and a gap is provided between the second film layer and the side plate.

Optionally, the gap is greater than or equal to 0.2 mm.

Optionally, the second film layer comprises one or more of a light guide plate, a lower prism sheet, a diffusion film, and a reflection sheet.

Embodiments of the present disclosure also provide a display device comprising display panel and aforementioned backlight module, the display panel is disposed at a surface close to the first film layer of the backlight module.

Optionally, further comprising an adhesive portion covering a side portion of the display panel and a side portion of the bonding portion.

DETAILED DESCRIPTION

Embodiments will now be described more fully with reference to the accompanying drawings. However, the embodiments can be embodied in a variety of forms and should not be construed as being limited to the embodiments set forth herein as will be understood by those skilled in the art. The same reference numerals in the drawings denote the same or similar structures, and thus their detailed description will be omitted.

Figure 1:
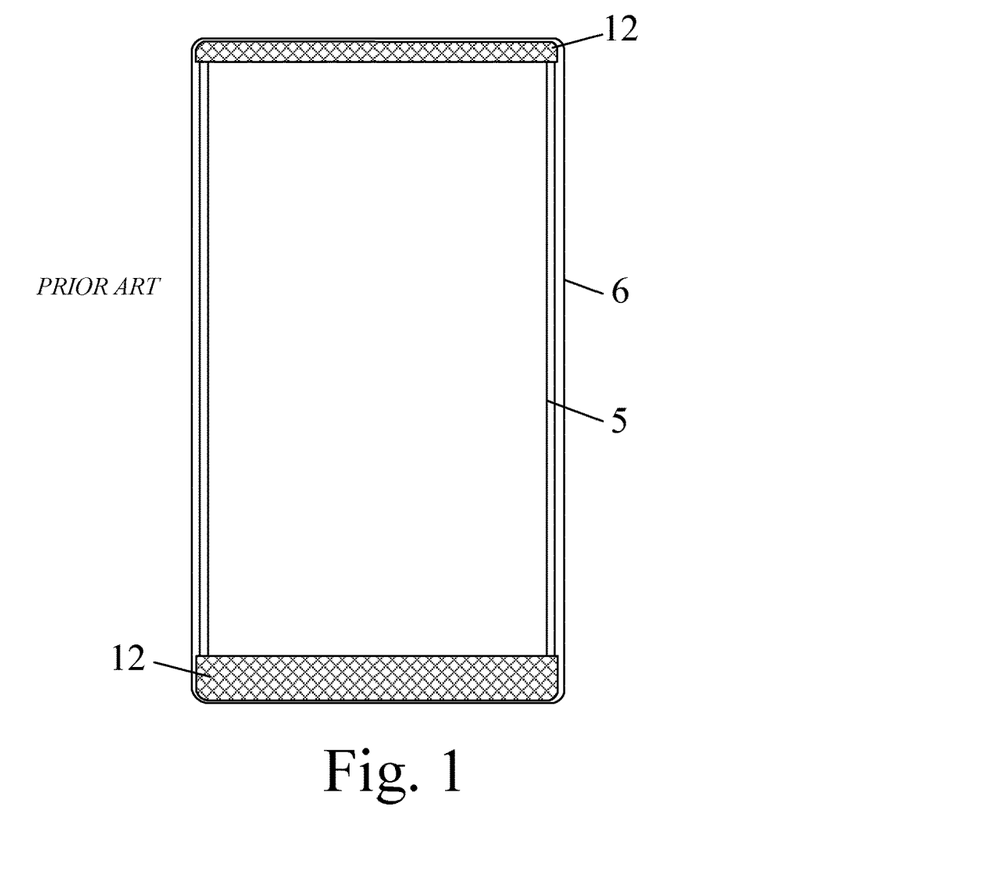
FIG. 1 is a front view of a backlight module in a related art.
Figure 2:
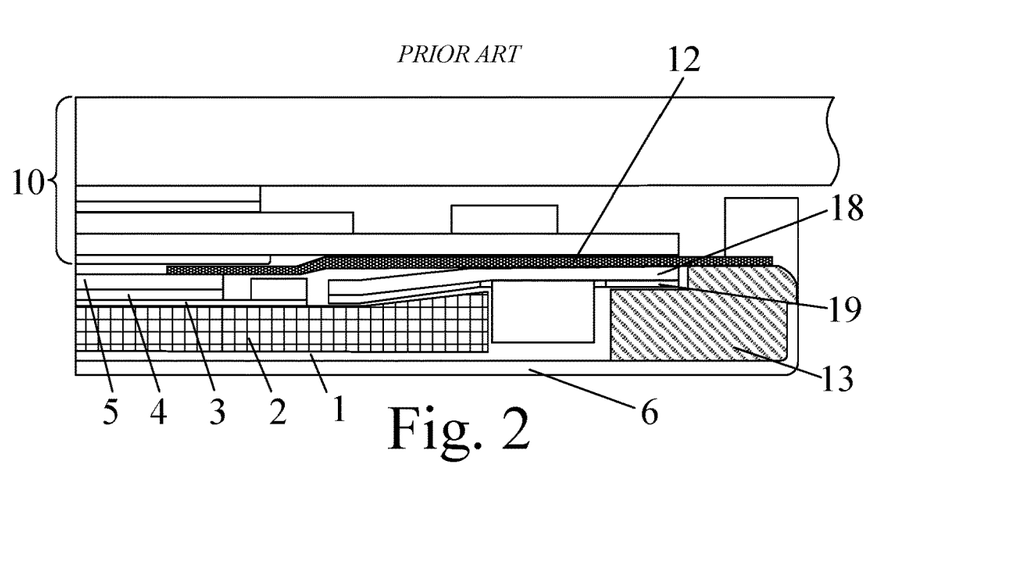
FIG. 2 is a partial cross-sectional view of a light source side in FIG. 1.
Figure 3:
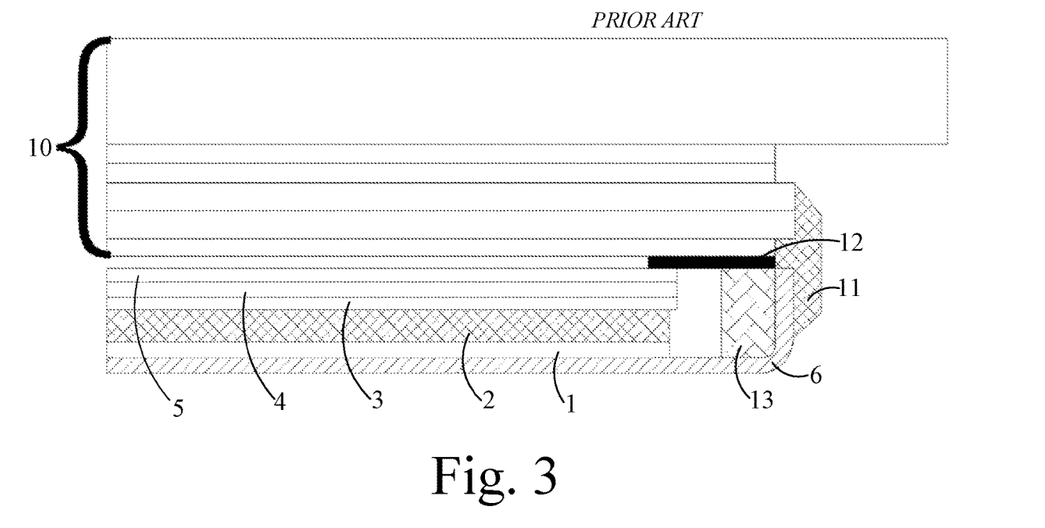
FIG. 3 is a partial cross-sectional view of an opposite side of the light source in FIG. 1.

FIG. 1 shows a front view of a backlight module in a related art. The lower part in the figure is the light source side and the upper part is the opposite side of the light source. For the sealing requirements of the backlight module assembly (preventing the backlight module disassembly and foreign object control) and the pre-fix requirements of the backlight module assembly (preventing the backlight module from being offset from the display panel before the glue is applied), a light-shielding tape 12 is required to be attached on the light source side and the opposite side of the light source, and a rubber frame 13 is required to be provided on the light source side and the opposite side of the light source. Referring to FIG. 2 showing the partial cross-sectional view of the light source side in FIG. 1, the light bar 18 is bonded to the rubber frame 13 and the light guide plate 2 by the light bar tape 19, and the upper prism sheet 5, the light bar 18, and the rubber frame 13 are bonded together by the light-shielding tape 12. Referring to FIG. 3 showing a partial cross-sectional view of the opposite side of the light source of FIG. 1, the light-shielding tape 12 bonds the upper prism sheet 5 to the plastic frame 13. Due to the influence of the injection molding process, the thickness of the rubber frame 13 on the opposite side of the light source is at least 0.3 mm. Considering that a gap needs to be reserved between the film of the backlight module and the rubber frame 13, the gap is about 0.05 mm, then the thickness of the back plate is made larger by 0.05 mm (the thickness of both sides is 0.1 mm). The size of the back plate of the related art is at least 1.05 mm. If the size of the back plate is smaller than this value, the risk of a bright line at the opposite side of the light source will increase. However, such structure is not conducive to obtain a narrow frame.

Figure 4:
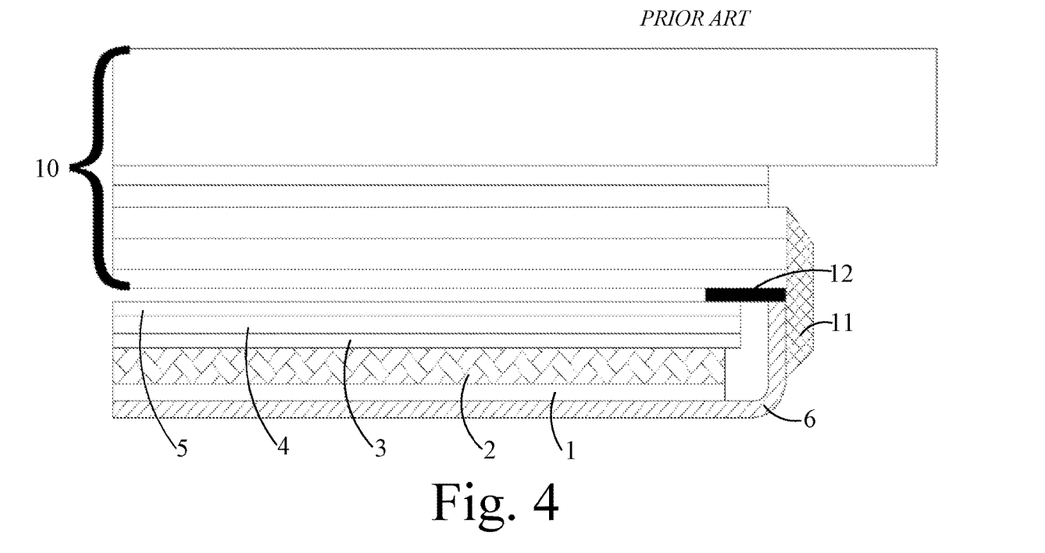
FIG. 4 is a schematic view after a rubber frame is removed in FIG. 3.

Referring to FIG. 4, a schematic structure is shown after a rubber frame is removed in FIG. 3. If the rubber frame is removed and the light-shielding tape is retained at the opposite side of the light source, the size of the combination of the light-shielding tape and the back plate is only 0.1 to 0.15 mm, such that it is impossible to achieve the adhesive and fix to the back plate, and the backlight module is easily disassembled. Moreover, when the size of the frame at the opposite side of the display panel light source is less than 0.70 mm (the light-shielding tape width≤0.40 mm at this time), the light-shielding tape cannot be cut. If the light-shielding tape is removed, the film of the backlight module is fixed only on the light source side, then the backlight module is easily disassembled, and the film of the backlight module is easily lifted and displaced due to the electrostatic adsorption when the display panel is assembled, thus resulting in a poor assembly.

Figure 5:
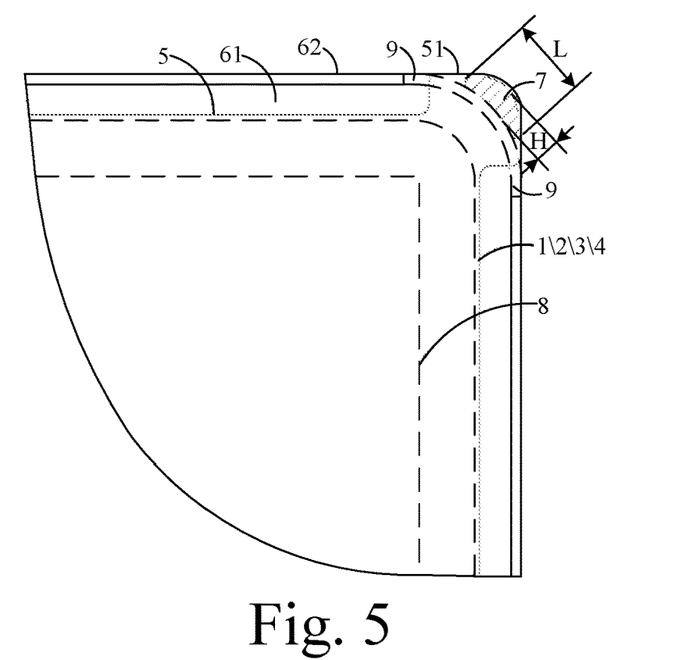
FIG. 5 is a schematic view of a backlight module according to a first embodiment of the present disclosure.

The embodiment of the present disclosure first provides a backlight module. The backlight module may include a back plate 6, a first film layer, and a bonding portion 7. The back plate 6 includes a back plate body 61 and a side plate 62. The side plate 62 is disposed at a periphery of the back plate body 61 and extends from the periphery of the back plate body 61. An accommodation space S is defined between the back plate body 61 and the side plate. The first film layer is located in the accommodation space S and is disposed as the outermost surface of the backlight module. The first film layer includes a film layer body and a protruding portion 51 protruding from a periphery of the film layer body, where a projection of the protruding portion 51 at the plane of the backlight exceeds a projection of the side panel 62 at the plane of the backlight. The bonding portion 7 is disposed at the outer side of the side plate 62 and bonds the protruding portion 51 and the side plate 62.

In the present embodiment, the side plate 62 is provided with corner portions corresponding to corners of the back plate body 61. The first film layer is located as the outermost surface of the backlight module, and the protruding portion 51 is disposed at the corner of the first film layer. The bonding portion 7 can be used to bond the protruding portion 51 and the corner portion of the side plate 62.

Specifically, the backlight module may include a back plate 6, an upper prism sheet 5, a lower prism sheet 4, a diffusion film 3, a light guide plate 2, a reflection sheet 1, and the like, which are disposed in the back sheet 6 subsequently from bottom to top. The back plate 6 may include a back plate body 61 and a side plate 62. The side plate 62 is disposed at a periphery of the back plate body 61 and extends from the periphery of the back plate body 61, and the side plate 62 is provided with corner portions corresponding to corners of the back plate body 61, such that an accommodation space S is defined between the back plate body 61 and the side plate to accommodate the upper prism sheet 5 and the lower prism sheet 4, the diffusion film 3, the light guide plate 2, and the reflection sheet 1. The side plate 62 extends beyond the outer surface of the upper prism sheet 5 located at the outermost surface, that is, the upper prism sheet 5 is configured as a concave structure with respect to the side plate 62.

The backlight module of the present disclosure will be described in detail with reference to four example embodiments as follows.

The First Embodiment

In the present embodiment, the display area 8 of the backlight module is configured to have a right angle. The lower prism sheet 4, the diffusion film 3, the light guide plate 2, and the reflection sheet 1 are each configured to have a round chamfer. In order to meet the display effect and the reliability requirement of the backlight module, the periphery of the light guide plate 2 exceeds the periphery of the display area 8 with a first set distance, and the value of the first set distance may be greater than or equal to 0.35 mm. A gap is provided between the periphery of the light guide plate 2 and the side of the side plate 62 close to the light guide plate 2. The value of the gap may be greater than or equal to 0.2 mm, for example, 0.4 mm, 0.6 mm. The size of the lower prism sheet 4, the diffusion film 3, and the reflection sheet 1 and a gap with respect to the side plate 62 may coincide with that of the light guide plate 2, which could be appropriately adjusted as needed.

In the present embodiment, the corner portion of the side plate 62 may be configured as a round corner. The radius of the round corner of the side plate 62 is larger than the radius of the round chamfer of the light guide plate 2. The round corner of the side plate 62 and the round chamfer of the light guide plate 2 may be substantially parallel with each other In the present embodiment, the first film layer may be the upper prism sheet 5. The upper prism sheet 5 includes an upper prism sheet body 52 and a protruding portion 51 protruding from a corner portion of the upper prism sheet body 52. The protruding portion 51 is protruded not only from the upper prism sheet body 52, but also from the side plate 62 after assembling. If the outermost surface of the backlight module is not the upper prism sheet, the first film layer may be a diffusion film. The protruding portions 51 are located at two corners of the opposite side of the light source of the backlight module, so that it is not needed to provide a rubber frame at the opposite side of the light source of the backlight module, so that the size of the opposite side of the light source of the backlight module can be narrowed by about 0.3 mm or more without a protruded part.

The following is an example in which the protruding portion 51 is located at the upper right corner of the upper prism sheet body 52:

The left edge of the projection 51 is perpendicular to the upper edge of the upper prism sheet body 52, and the lower edge of the projection 51 is perpendicular to the right edge of the upper prism sheet body 52, the upper edge of the projection 51 is coplanar with the upper outer edge of the plate 62, and the right edge of the projection 51 is coplanar with the right outer edge of the side plate 62, so that the projection 51 does not sharply protrude from the side plate 62 in the upper and right directions, but gradually protrudes until reaching a maximum at the corner. An angle formed by the upper edge of the projection 51 and the right edge of the projection 51 corresponds to the upper right corner of the side panel 62, and an angle formed by the upper edge of the projection 51 and the right edge of the projection 51 is configured to be a round chamfer, and the radius of the round chamfer may be smaller than the radius of the round corner of the side plate 62, such that the protrusion 51 protrudes from the side plate 62. In addition, in order to prevent the upper side edge and the right side edge of the protruding portion 51 protruding from the side plate 62 due to the offset of the upper prism sheet 5 during assembly, the upper side edge of the protruding portion 51 is configured to be retracted inwardly by about 0.1 mm with respect to the upper outer edge of the side plate 62, and the right side edge of the protruding portion 51 is retracted inwardly by about 0.1 mm with respect to the right outer edge of the side plate 62, that is, the dimensions of upper, lower, left and right of the protruding portion 51 may be reduced by about 0.1 mm.

In the present embodiment, the bonding portion 7 is disposed outside the upper right corner of the side plate 62 and is located on the side of the protruding portion 51 close to the back plate body 61, and the bonding portion 7 bonds the side plate 62 and the protruding portion 51 together. Since the upper prism sheet 5, which is located at the outermost surface of the backlight module, and the back sheet 6, which is located at the innermost side of the backlight module, are bonded together, the middle lower prism sheet 4, the diffusion film 3, the light guide plate 2, the reflection sheet 1, and the like can be fixed so that the backlight module is not easily disassembled. Also, during assembly of the backlight module with the display panel 10, the film of the backlight module is not easily lifted or shifted by the electrostatic adsorption, thus, a poor assembly is not created.

Since the side plate 62 extends beyond the outer surface of the upper prism sheet 5 located at the outermost surface, and the protruding portion 51 of the upper prism sheet 5 protrudes from the side plate 62, the side plate 62 will block the protruding portion 51 so that the protruding portion 51 cannot protrude from the side plate 62, or the upper prism sheet 5 is uneven when the protruding portion 51 protrudes from the side plate 62, thereby affecting the display effect. In the present embodiment, a recess 9 is provided at the side plate 62 through which the protrusion 51 can protrude outside the accommodation space S. The recess 9 allows the projection 51 to protrude from the side panel 62 without being blocked by the side panel 62, thereby ensuring its flatness without affecting the display effect.

In order to prevent the backlight module from being disassembled, the product of the thickness H of the bonding portion 7 and the length L of the bonding portion 7 meets the following conditions:

$$H \cdot L \geq \frac{K \cdot Mg}{F}$$

wherein, Mg represents the weight of the backing plate 6; F represents the bonding strength between the bonding portion 7 and the first film layer; K≥1, which is a reliability coefficient, and mainly considers the safety factor corresponding to the severe condition. Under the present condition, the adhesive force of the bonding portion 7 and the upper prism sheet 5 is smaller than the bonding force between the bonding portion 7 and the side plate 62, and the bonding area of the bonding portion 7 and the side plate 62 is larger than that of the bonding portion 7 and the upper prism sheet 5.

In the present embodiment, the thickness H of the bonding portion 7 may be the distance between the surface of the bonding portion 7 facing away from the side plate 62 and the surface of the bonding portion 7 bonded to the side plate 62. The thickness of the bonding portion 7 is greater than or equal to 0.2 mm, the protruding portion 51 protrudes from the side plate 62 by 0.3 mm or more, and the more the protruding portion 51 protrudes from the side plate 62, the larger the thickness of the bonding portion 7 is, and firmer the bonding is. The length L of the bonding portion 7 may be a length of a portion of the bonding portion 7 extending in the direction of the contact line of the side plate 62 and the upper prism sheet 5.

The Second Embodiment

Figure 6:
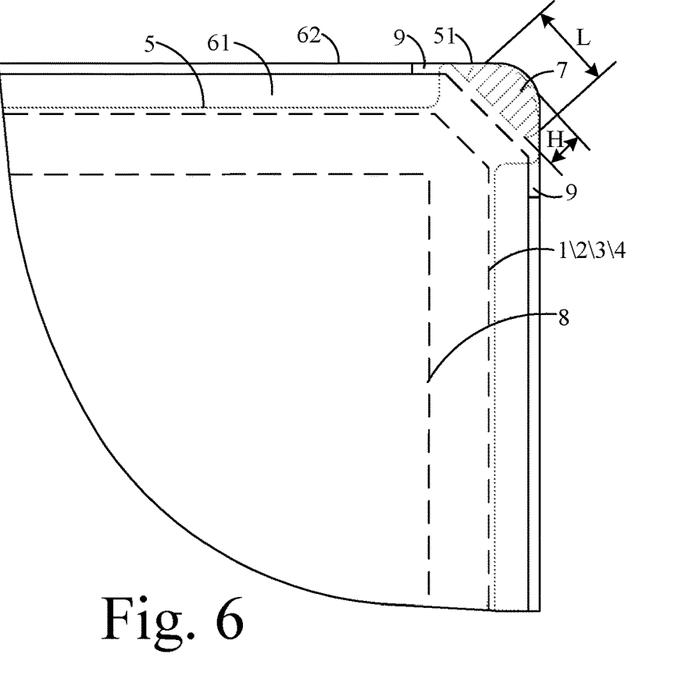
FIG. 6 is a schematic view of a backlight module according to a second embodiment of the present disclosure.

FIG. 6 is a schematic view of a backlight module according to a second embodiment of the present disclosure.

The present embodiment is substantially the same as the first embodiment, except that: first, the lower prism sheet 4, the diffusion film 3, the light guide plate 2, and the reflection sheet 1 are each provided with a chamfer angle, and the angle of the chamfer is 45 degrees. Second, correspondingly, the corner portion of the side plate 62 is also set as an oblique angle, and the oblique angle is also 45 degrees. In the case where the round chamfering of the protruding portion 51 is the same as that of the first embodiment, there is a wider space for accommodating the bonding portion 7, so that the bonding portion 7 can be wider, the bonding effect is improved, and the bonding is firm. The protruding portion 51 may also be provided as a chamfer angle with an angle of 45 degrees.

The Third Embodiment

Figure 7:
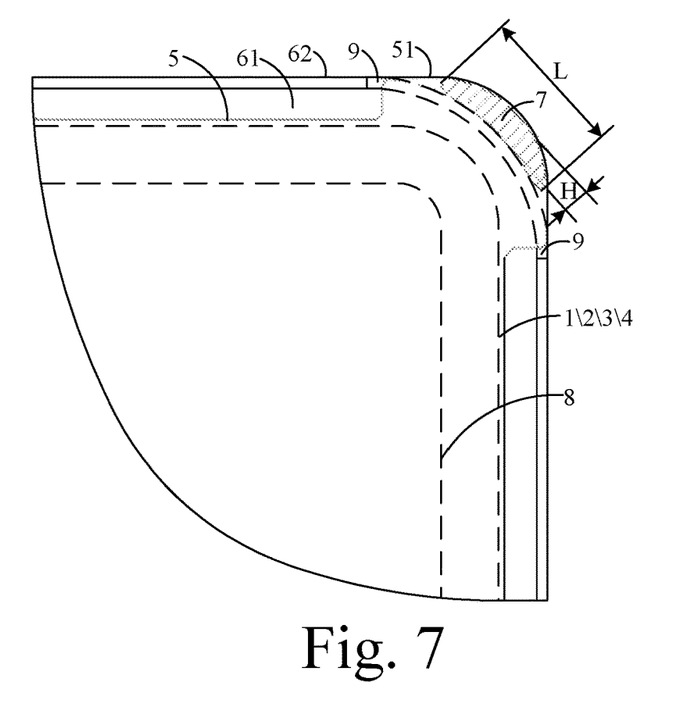
FIG. 7 is a schematic view of a backlight module according to a third embodiment of the present disclosure.

FIG. 7 is a schematic view of a backlight module according to a third embodiment of the present disclosure.

The present embodiment is substantially the same as the first embodiment, except that: the display area 8 of the backlight module can be configured to have a round chamfer, so that the radius of the round chamfer of the lower prism sheet 4, the diffusion film 3, the light guide plate 2, and the reflection sheet 1 can be set larger. The radius of the rounded corner of the side plate 62 may be set larger, so that the arc portion of the rounded corner of the side plate 62 is longer, and in the case where the rounded chamfer of the protruding portion 51 is the same as in the first embodiment, there is a longer and wider space to accommodate the bonding portion 7, so that the bonding portion 7 can be set longer and wider, thereby improving the bonding effect and making the bonding firm. The round chamfer of the protrusion 51 can also be larger, and the protrusion 51 can also have a chamfer angle with an angle of 45 degrees.

The Fourth Embodiment

Figure 8:
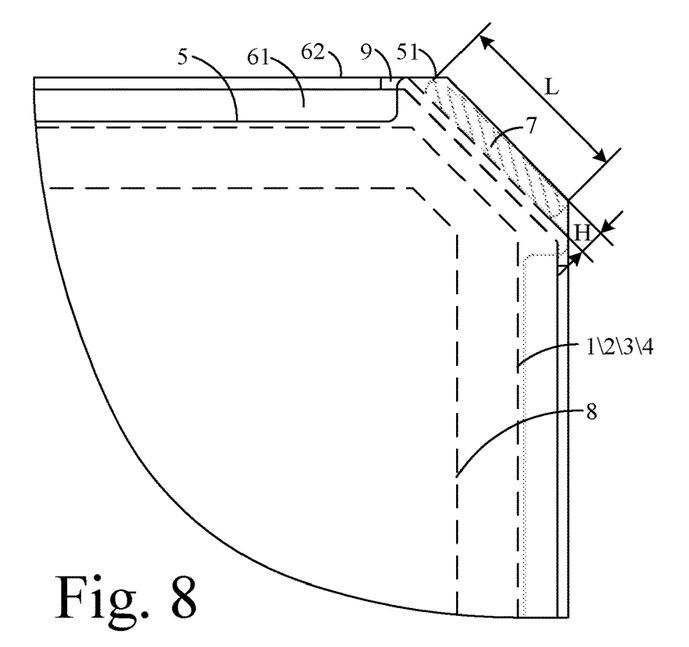
FIG. 8 is a schematic view of a backlight module according to a fourth embodiment of the present disclosure.

FIG. 8 is a schematic view of a backlight module according to a fourth embodiment of the present disclosure.

The present embodiment is substantially the same as the first embodiment, except that: first, the display area 8 of the backlight module can be set to have a chamfer angle, and the angle of the chamfer is 45 degrees. Second, correspondingly, the lower prism sheet 4, the diffusion film 3, the light guide plate 2, and the reflection sheet 1 can have a chamfer angle, and the angle of the chamfer is 45 degrees. Further, the retracting distance of the chamfering angle of the lower prism sheet 4, the diffusion film 3, the light guide plate 2, and the reflection sheet 1 can be set larger than that of the second embodiment. Third, correspondingly, the corner portion of the side plate 62 can also be set as an oblique angle, and the oblique angle is also 45 degrees. In the case where the retracting distance of the chamfering angle of the lower prism sheet 4, the diffusion film 3, the light guide plate 2, and the reflection sheet 1 is large, the retracting distance of the corner portion of the side plate 62 can also be large, thereby the oblique surface of the corner portion of the side plate 62 is configured to have a large length so that there is a larger space for accommodating the bonding portion 7. In the case where the rounded chamfer of the protruding portion 51 is the same as in the first embodiment, there is a longer and wider space to accommodate the bonding portion 7, so that the bonding portion 7 can be set longer and wider, thus improving the bonding effect and making the bonding firm. The round chamfer of the protrusion 51 can also be set larger, and the protrusion 51 can also be set to have a chamfer angle with an angle of 45 degrees.

In the present embodiment, the protruding portion 51 may also be configured to have a chamfer angle, and the angle of the chamfer is 45 degrees.

Figure 9:
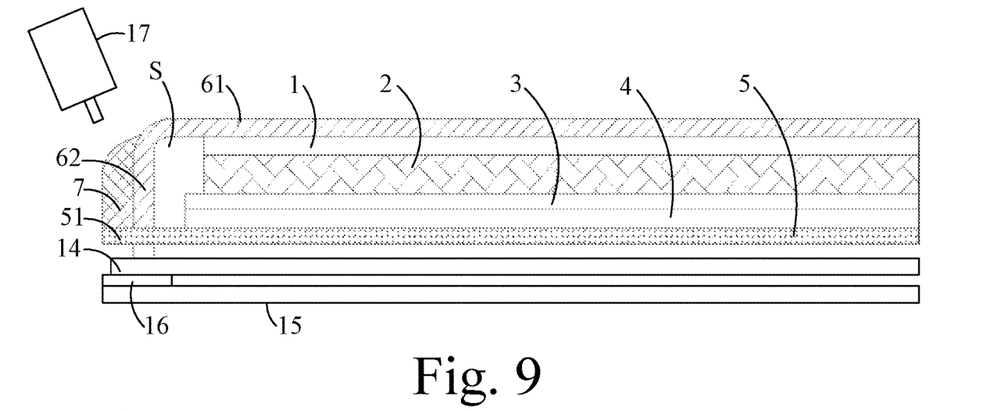
FIG. 9 is a schematic view of a backlight module according to the present disclosure, which shows a position of a bonding portion.

FIG. 9 is a schematic view of a backlight module according to the present disclosure, which shows a position of a bonding portion. In order to facilitate to dispense at corners of the backlight module, after the light-shielding tape 12 on the light source side is mounted, the protective film 14 is laid on the entire backlight module to protect the backlight module from being contaminated and scratched. Then, the backlight module is fixed upside down, even if the upper prism sheet 5 is at the bottom, and the backlight module is placed on the table 15 with a spacer 16 disposed under the upper prism corner.

The bonding portion 7 is formed by hot melt adhesive spraying. When the hot melt adhesive is sprayed, a head 17 can be inclined at a setting angle to prevent the spraying range from exceeding the protruding portion 51 or the bonding area being insufficient. The setting angle requires the operator to adjust the number of times.

Figure 10:
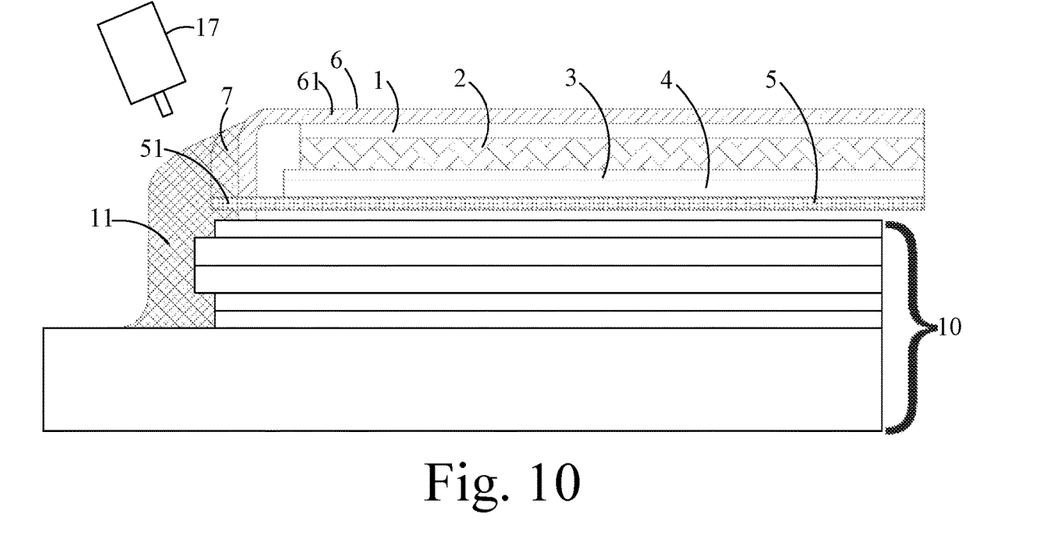
FIG. 10 is a schematic view of a display device according to an embodiment of the present disclosure.

The present disclosure further provides a display device. Referring to FIG. 10, which is a schematic view of a display device according to an embodiment of the present disclosure, the display device may include a display panel 10, the backlight module, and the like. The display panel 10 may be disposed on the backlight. The specific structure of the backlight module has been described in detail above, and therefore will not be described herein.

In the present embodiment, the display device may further include an adhesive portion 11 covering the side portion of the display panel 10 and the side portion of the bonding portion 7. The adhesive portion 11 covers the side portions of the display panel 10 to fix the respective layers of the display panel 10. The adhesive portion 11 covers the side portion of the display panel 10 and the side portion of the bonding portion 7. The adhesive portion 11 fixes the display panel 10 and the backlight module, and the backlight module could be fixed more firmly, thus not easily being disintegrated In this embodiment, during the assembly of the backlight module and the display panel 10, the assembly station of the backlight module and the station forming the adhesive portion 11 can be set as a continuous station. Instead of adsorbing the prism sheet 5, the backlight module is adsorbed in the form of an adsorption backing plate 6. The backlight module and the display panel 10 are pre-pressed and fixed to prevent the backlight module and the display panel 10 from being misaligned and misaligned due to excessive transportation. During the fabrication of the adhesive portion 11, the backlight module can be reversed. Even if the upper prism sheet 5 of the backlight module is located below, the display panel 10 is located below the backlight module; then, the outer periphery of the backlight module and the display panel 10 is coated with glue, and the glue at the corners portions is covered with the bonding portion 7 of the backlight module. The backlight module can also be placed in a vertical position, and the backlight module needs to be fixed by using a suitable fixture and method. An assembly manner includes the backlight module being located lower and the display panel 10 being located upper, and, after assembly, it is rotated by 180 degrees by a rotating platform to realize the arrangement mode, as shown in FIG. 10.

The adhesive portion 11 is formed by hot melt adhesive spraying. When the hot melt adhesive is sprayed, the spray head 17 can be inclined at a setting angle to prevent the spray range from exceeding a right angle region formed by the upper polarizer and the edge of the cover panel of the display panel, thereby preventing the adhesive from overflowing or the bonding area being insufficient after assembly. The setting angle requires the operator to adjust the number of times.

The full name of Polyurethane Reactive (PUR) is a moisture-curing reactive polyurethane hot melt adhesive. The main component is a terminal isocyanate polyurethane prepolymer. PUR has an adjustable adhesion and toughness (elasticity) and excellent bond strength, temperature resistance, chemical resistance, and aging resistance. It has become the main binder in the electronics industry, and it is usually used in mobile phone covers and cabinets.

As can be seen from the above technical solutions, the present disclosure has at least one of the following advantages and positive effects:

The backlight module of the present disclosure includes a back plate body and a side plate disposed at the outer periphery of the back plate body and extending from the outer periphery of the back plate body. The backlight module further includes a first film layer located at the outermost side, and the first film layer is provided with a protruding portion protruding from the side plate. The protruding portion and the side plate is bonded through the bonding portion, such that each film layer of the backlight module is bonded and fixed, therefore the backlight module is not easily disassembled; and the film of the backlight module is easily lifted and displaced due to the electrostatic adsorption when the display panel is assembled, thusly resulting in poor assembly.

The features, structures, or characteristics described above may be combined in any suitable manner in one or more embodiments, and the features discussed in the various embodiments are interchangeable, if possible. In the description above, numerous specific details are set forth to provide a thorough understanding of the embodiments of the disclosure. However, those skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although the relative terms such as "upper" and "lower" are used in the specification to describe the relative relationship of one component of the icon to another component, these terms are used in this specification for convenience only, for example, according to the accompanying drawings. The direction of the example described. It will be understood that if the device of the icon is flipped upside down, the component described above will become the component "below". When a structure is "on" another structure, it may mean that a structure is integrally formed on another structure, or that a structure is "directly" disposed on another structure, or that a structure is "indirectly" disposed through another structure or other structures.

In the present specification, the terms "a", "an", "the" and "the" are used to mean the presence of one or more elements/components, etc.; the terms "including", "including" and "having" Represents the meaning of openness and means that there may be additional elements/components/etc. in addition to the listed elements/components/etc; the terms "first", "second", and "third" etc. is used only as a token, not a limit on the number of objects.

It should be understood that the present disclosure does not limit its application to the detailed structure and arrangement of the components presented in the specification. The present disclosure is capable of other embodiments and of various embodiments. The foregoing variations and modifications are intended to fall within the scope of the present disclosure. It is to be understood that the disclosure disclosed and claimed herein extends to all alternative combinations of two or more individual features that are mentioned or apparent in the drawings. All of these different combinations constitute a number of alternative aspects of the present disclosure. The embodiments described in the specification are illustrative of the best mode of the present disclosure, and will enable those skilled in the art to utilize this disclosure.

What is claimed is:

1. A backlight module, comprising:
    a back plate comprising a back plate body and a side plate, the side plate being disposed at a periphery of the back plate body and extending from the periphery of the back plate body, wherein an accommodation space is defined between the back plate body and the side plate;
    a first film layer located in the accommodation space, the first film layer being disposed as the outermost surface of the backlight module, and comprising a film layer body and a protruding portion protruding from a periphery of the film layer body, a projection of the protruding portion at a plane of the backlight exceeding a projection of the side panel at a plane of the backlight; and
    a bonding portion disposed at an outer side of the side plate and bonding the protruding portion and the side plate.

2. The backlight module according to claim 1, wherein the film layer body is coplanar with the protruding portion.

3. The backlight module according to claim 2, wherein the side plate is provided with corner portions corresponding to corners of the back plate body, and the protruding portion is disposed correspondingly to at least one corner.

4. The backlight module according to claim 3, wherein the protruding portion is one of a plurality of protruding portions disposed at each of the corner portions correspondingly.

5. The backlight module according to claim 3, wherein at least one of the corner portions of the side plate is configured to have a chamfer angle or an oblique angle.

6. The backlight module according to claim 5, wherein the protruding portion is provided with a chamfer angle or an oblique angle corresponding to the chamfer angle or the oblique angle of the corner portion of the side plate.

7. The backlight module according to claim 1, wherein a recess is provided at the side plate through which the protruding portion is configured to protrude outside the accommodation space.

8. The backlight module according to claim 1, wherein a display area of the backlight module is configured to have a chamfer angle or an oblique angle.

9. The backlight module according to claim 1, wherein a product of a thickness H of the bonding portion and a length L of the bonding portion meets the following conditions:

$$H \cdot L \geq \frac{K \cdot Mg}{F},$$

wherein, Mg represents a weight of the backing plate; F represents a bonding strength between the bonding portion and the first film layer; K≥1, which is a reliability coefficient.

10. The backlight module according to claim 1, wherein a thickness of the bonding portion is greater than or equal to 0.2 mm.

11. The backlight module according to claim 1, wherein the first film layer is an upper prism sheet.

12. The backlight module according to claim 1, further comprising:
    a second film layer disposed between the first film layer and the back plate body; and
    a gap provided between the second film layer and the side plate.

13. The backlight module according to claim 12, wherein the gap is greater than or equal to 0.2 mm.

14. The backlight module according to claim 12, wherein the second film layer comprises one or more of a light guide plate, a lower prism sheet, a diffusion film, and a reflection sheet.

15. A display device, comprising:
    a backlight module and a display panel, wherein the backlight module comprises:
        a back plate comprising a back plate body and a side plate, the side plate being disposed at a periphery of the back plate body and extending from the periphery of the back plate body, wherein an accommodation space is defined between the back plate body and the side plate;

a first film layer located in the accommodation space, the first film layer being disposed as the outermost surface of the backlight module, and comprising a film layer body and a protruding portion protruding from a periphery of the film layer body, a projection of the protruding portion at a plane of the backlight exceeding a projection of the side panel at a plane of the backlight; and a bonding portion disposed at an outer side of the side plate and bonding the protruding portion and the side plate, wherein the display panel is disposed at a surface close to the first film layer of the backlight module.

16. The display device according to claim 15, further comprising an adhesive portion covering a side portion of the display panel and a side portion of the bonding portion.

* * * * *